(12) United States Patent
Lee (10) Patent No.: US 11,094,325 B2
(45) Date of Patent: Aug. 17, 2021

(54) DEVICE AND METHOD FOR PROCESSING VOICE COMMAND FOR VEHICLE

(71) Applicants: HYUNDAI MOTOR COMPANY, Seoul (KR); KIA MOTORS CORPORATION, Seoul (KR)

(72) Inventor: Seung Shin Lee, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 168 days.

(21) Appl. No.: 16/425,142

(22) Filed: May 29, 2019

(65) Prior Publication Data

US 2020/0175979 A1 Jun. 4, 2020

(30) Foreign Application Priority Data

Dec. 3, 2018 (KR) .................. 10-2018-0153949

(51) Int. Cl.
| | |
|---|---|
| *G10L 15/22* | (2006.01) |
| *G10L 15/30* | (2013.01) |
| *G06F 3/0488* | (2013.01) |
| *G06F 3/01* | (2006.01) |
| *G06F 3/16* | (2006.01) |
| *G06F 3/14* | (2006.01) |
| *G06F 3/0482* | (2013.01) |

(52) U.S. Cl.
CPC .............. *G10L 15/22* (2013.01); *G06F 3/013* (2013.01); *G06F 3/0482* (2013.01); *G06F 3/04883* (2013.01); *G06F 3/1423* (2013.01); *G06F 3/167* (2013.01); *G10L 15/30* (2013.01); *G10L 2015/223* (2013.01)

(58) Field of Classification Search
USPC ......... 704/200–275; 382/100–104, 117–123, 382/168–170, 155–159
See application file for complete search history.

(56) References Cited

U.S. PATENT DOCUMENTS

| | | | |
|---|---|---|---|
| 7,158,871 B1 | 1/2007 | Ilan et al. | |
| 8,514,276 B2* | 8/2013 | Ishii | B60K 37/06 348/77 |
| 2002/0128762 A1* | 9/2002 | Noguchi | B60R 16/0373 701/51 |

(Continued)

FOREIGN PATENT DOCUMENTS

| | | |
|---|---|---|
| JP | 2006-189394 A | 7/2006 |
| KR | 10-2006-0121341 A | 11/2006 |

(Continued)

*Primary Examiner* — Marcellus J Augustin (57) ABSTRACT

A device for processing a voice command for a vehicle includes: a communication module to transmit a voice command received from a user to a voice recognition server, and to receive a recognized voice command from the voice recognition server; a controller identifying objects displayed on a screen of a touch display, and classifying the recognized voice command into a control command and a touch-based command; a control command processing module to perform a control operation corresponding to the control command; and a touch-based command processing module for selecting an object corresponding to the touch-based command from the touch display.

20 Claims, 6 Drawing Sheets

(56) References Cited

U.S. PATENT DOCUMENTS

| | | | | |
|---|---|---|---|---|
| 2011/0022393 A1* | 1/2011 | Waller | ............... | G01C 21/3664 |
| | | | | 704/270 |
| 2012/0245945 A1* | 9/2012 | Miyauchi | ................ | G10L 15/06 |
| | | | | 704/275 |
| 2015/0336588 A1* | 11/2015 | Ebner | ................ | G01C 21/3664 |
| | | | | 701/2 |
| 2016/0240189 A1* | 8/2016 | Lee | .......................... | G10L 15/22 |
| 2016/0259459 A1* | 9/2016 | Yang | .................... | G06F 1/3206 |
| 2016/0274717 A1* | 9/2016 | Wako | .................... | G06F 3/0488 |
| 2018/0357040 A1* | 12/2018 | Spiewla | .................. | G06F 3/017 |
| 2019/0361719 A1* | 11/2019 | Vangala | ................. | G06F 9/453 |

FOREIGN PATENT DOCUMENTS

| | | |
|---|---|---|
| KR | 10-2007-0060885 A | 6/2007 |
| KR | 10-2012-0090659 A | 8/2012 |
| KR | 10-2017-0065763 A | 6/2017 |

\* cited by examiner

DEVICE AND METHOD FOR PROCESSING VOICE COMMAND FOR VEHICLE

CROSS-REFERENCE TO RELATED APPLICATION

This application claims priority to and the benefit of Korean Patent Application No. 10-2018-0153949, filed on Dec. 3, 2018, the entire contents of which are incorporated herein by reference.

FIELD

The present disclosure relates to a device and a method for processing a voice command for a vehicle.

BACKGROUND

The statements in this section merely provide background information related to the present disclosure and may not constitute prior art.

As an electronic technology develops and consumers demand more convenience features, various electronic control devices and utility devices have been used for a vehicle. Operations of these electronic control devices and utility devices may be performed by a driver's voice command.

Therefore, in order that the various operations of the various electronic control devices and utility devices mounted on the vehicle are controlled by the voice command, a list of commands for voice recognition suitable for each application previously input by an application producer is configured in a table form for each of the devices. The input voice command is recognized by the devices, and then, an operation corresponding to the input voice command is performed.

In setting the list of the commands for the voice recognition for each application of each device, it is practically impossible to consider the number of all cases for a large number of users. Thus, a setting method based on a subjectivity of the producer or sample survey data has been adopted.

We have discovered that there is a limitation to the recognition of the voice command. In particular, when a recognition rate of the voice command is low, the operations of the desired utility device and control device may not be performed.

In particular, we have found that the conventional devices for processing a voice command for a vehicle simply control the operations of the various devices in the vehicle based on the input voice command of the user, but do not classify the voice command into a control command and a touch-based command. Accordingly, the conventional devices do not function to select (touch) an object displayed on a touch display provided in the vehicle.

SUMMARY

The present disclosure has been made to solve the above-mentioned problems occurring in the prior art while advantages achieved by the prior art are maintained intact.

An aspect of the present disclosure provides a device and a method for processing a voice command for a vehicle that may classify a voice command received from a user into a control command and a touch-based command, and process the control command and the touch-based command, respectively. Therefore, the device and the method may operate devices based on the control command, and select the object corresponding to the touch-based command on the display.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for processing a voice command for a vehicle, the device includes: a communication module configured to transmit a voice command received from a user to a voice recognition server, and to receive a recognized voice command from the voice recognition server; a controller configured to identify objects displayed on a screen of a touch display, and to classify the recognized voice command into a control command and a touch-based command; a control command processing module configured to perform a control operation corresponding to the control command; and a touch-based command processing module configured to select an object corresponding to the touch-based command among the objects on the touch display.

According to an aspect of the present disclosure, when a predicate is present in the recognized voice command, the controller may determine the recognized voice command as the control command.

According to an aspect of the present disclosure, the touch-based command processing module may select at least one object containing the touch-based command, among the identified objects on the screen, based on the recognized voice command.

According to another aspect of the present disclosure, when the object corresponding to the touch-based command is absent among the identified objects on the screen, the touch-based command processing module may transmit the touch-based command to the control command processing module.

In another form of the present disclosure, when the object corresponding to the touch-based command is not able to be selected among the identified objects on the screen, the touch-based command processing module may transmit the touch-based command to the control command processing module.

According to an aspect of the present disclosure, the device may further include an eye tracking device configured to track an eye of the user.

According to an aspect of the present disclosure, when the touch display includes a plurality of touch displays, the controller may specify one touch display among the plurality of touch displays using the eye tracking device. According to an aspect of the present disclosure, the controller may select a touch display, among the plurality of touch displays, based on a gaze of the eye of the user at a time when the voice command is input from the user.

According to an aspect of the present disclosure, the device may further include an input module that has an input button configured to inform an input of the voice command from the user. According to an aspect of the present disclosure, the controller may identify each of the objects on the screen of the touch display at a time when the input button is pressed.

According to an aspect of the present disclosure, a method for processing a voice command for a vehicle includes: identifying, by a controller, objects displayed on a screen of a touch display; transmitting, by a communication module, a voice command received from a user to a voice recognition server; receiving, by the communication module, a recognized voice command from the voice recognition server; classifying, by the controller, the recognized voice command into a control command and a touch-based command; performing, by a control command processing module, a control operation corresponding to the control command; and selecting, by a touch-based command processing module, an object corresponding to the touch-based command from the screen of the touch display.

According to an aspect of the present disclosure, classifying the recognized voice recognized may include determining the recognized voice command as the control command when a predicate is present in the recognized voice command.

According to an aspect of the present disclosure, selecting the object corresponding to the touch-based command may include selecting at least one object containing the touch-based command, among the identified objects on the screen, based on the recognized voice command.

According to an aspect of the present disclosure, selecting the object corresponding to the touch-based command may include transmitting the touch-based command to the control command processing module when the object corresponding to the touch-based command is absent among the identified objects on the screen.

According to an aspect of the present disclosure, selecting the object corresponding to the touch-based command may include transmitting the touch-based command to the control command processing module, when the object corresponding to the touch-based command is not able to selected among the identified objects on the screen.

According to an aspect of the present disclosure, the method may further include, when the touch display includes a plurality of touch displays, specifying, by the controller, one touch display, among the plurality of touch displays, using an eye tracking device. According to another aspect of the present disclosure, specifying the one touch display among the plurality of touch displays may include selecting the one touch display based on a gaze of an eye of the user at a time when the voice command is input from the user.

According to another aspect of the present disclosure, identifying the objects displayed on the touch display may include identifying each of the objects on the screen of the touch display at a time when an input button is pressed for an input of the voice command of the user.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Further, in describing the form of the present disclosure, a detailed description of the related known configuration or function will be omitted when it is determined that it interferes with the understanding of the form of the present disclosure.

In describing the components of the form according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
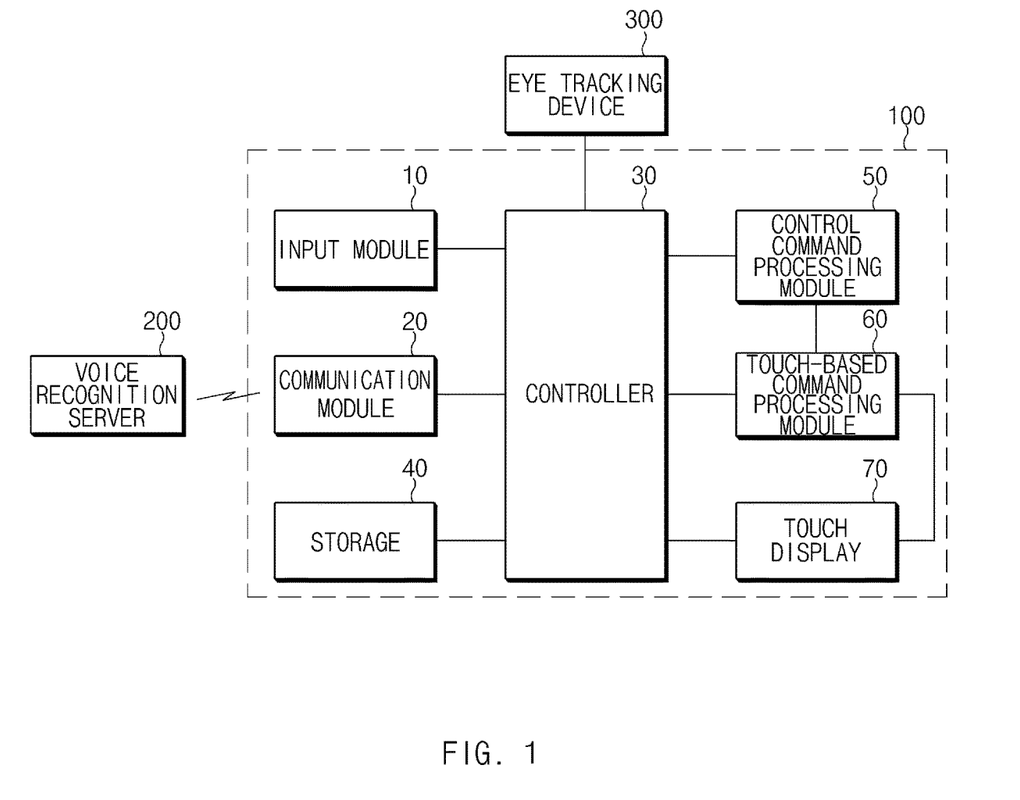
FIG. 1 is a schematic diagram of a voice command processing device for a vehicle.

FIG. 1 is a schematic diagram of a voice command processing device for a vehicle according to one form of the present disclosure.

As shown in FIG. 1, a voice command processing device 100 for a vehicle may include: an input module 10, a communication module 20, a controller 30, storage 40, a control command processing module 50, a touch-based command processing module 60, and a touch display 70. In one example, those components may be coupled to each other in a manner for implementing the voice command processing device for a vehicle according to one form of the present disclosure, and some components may be omitted in a manner for implementing the present disclosure.

Regarding the above components, first, the input module 10 may be implemented in a microphone mounted on a vehicle, and receive a voice command from a user.

Figure 2:
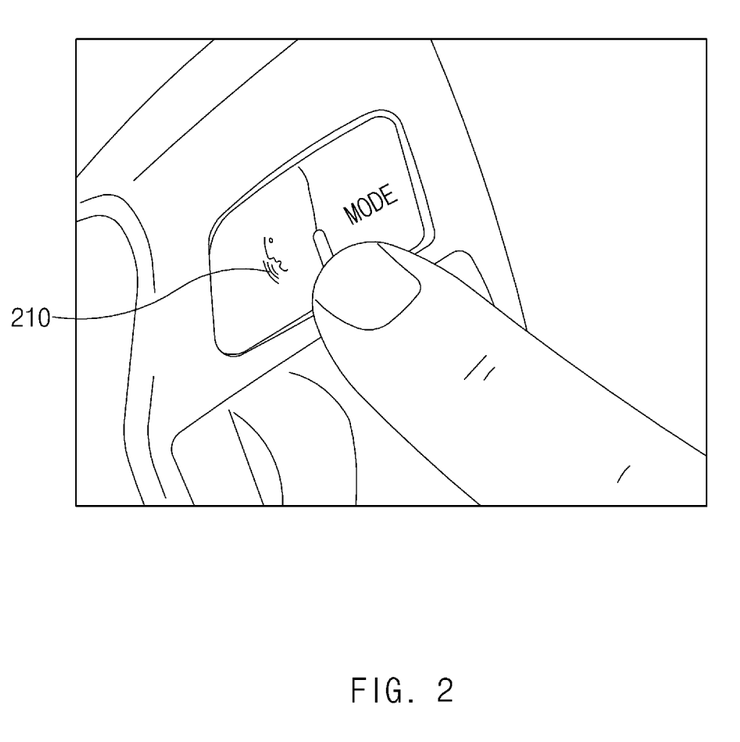
FIG. 2 shows an input button.

Further, as shown in FIG. 2 as one form of the present disclosure, the input module 10 may further include an input button 210. Thus, the user may input the voice command after pressing the input button 210. Then, the controller 30 may predict to receive the voice command when the input button 210 is pressed.

Next, the communication module 20 provides a communication interface with a voice recognition server 200. The communication module 20 may transmit the voice command to the voice recognition server 200, and receive a recognized voice command from the voice recognition server 200. This communication module 20 may receive the recognized voice command in following three ways.

1) The communication module 20 may communicate with the voice recognition server 200 using a Vehicle to Everything (V2X) communication (V2X) to receive the voice recognition result. In this connection, the V2X collectively refers to as a wireless communication between a vehicle and a vehicle (V2V: Vehicle to Vehicle), a wireless communication between a vehicle and an infrastructure (V2I: Vehicle to Infrastructure), an in-vehicle wired/wireless networking (IVN: In-Vehicle Networking), a communication between a vehicle and a mobile terminal (V2P: Vehicle to Pedestrian), and the like.

2) The communication module 20 may communicate with the voice recognition server 200 using a short-range wireless communication to receive the voice recognition result. In this connection, the short-range wireless communication may include a Bluetooth™, an RFID (Radio Frequency Identification), an infrared communication (Infrared Data Association; IrDA), a UWB (Ultra Wideband), a ZigBee, an NFC (Near Field Communication), a Wireless USB (Wireless Universal Serial Bus), and the like.

3) The communication module 20 may communicate with the voice recognition server 200 using a mobile communication or a wireless internet to receive the voice recognition result.

In this connection, the mobile communication may include a GSM (Global System for Mobile) communication, a CDMA (Code Division Multi Access), a CDMA2000 (Code Division Multi Access 2000), an EV-DO (Enhanced Voice-Data Optimized or Enhanced Voice-Data Only), a WCDMA (Wideband CDMA), an HSDPA (High Speed Downlink Packet Access), an HSUPA (High Speed Uplink Packet Access), an LTE (Long Term Evolution), an LTEA (Long Term Evolution-Advanced), and the like.

In addition, the wireless internet may include a WLAN (Wireless LAN), a Wi-Fi (Wireless-Fidelity), a Wi-Fi (Wireless Fidelity) Direct, a DLNA (Digital Living Network Alliance), a WiBro (Wireless Broadband), a WiMAX (World Interoperability for Microwave Access), an HSDPA (High Speed Downlink Packet Access), an HSUPA (High Speed Uplink Packet Access), an LTE (Long Term Evolution), an LTE-A (Long Term Evolution-Advanced), and the like.

Next, the controller 30 performs an overall control such that each of the components may perform a function thereof normally. This controller 30 may be implemented in hardware or software, or in a combination thereof. In one form, the controller 30 may be implemented in a microprocessor, but is not limited thereto.

Further, the controller 30 may control the input module 10 to receive the voice command from the user.

Further, the controller 30 may control the communication module 20 to transmit the voice command to the voice recognition server 200, and to receive the recognized voice command from the voice recognition server 200.

Figure 3:
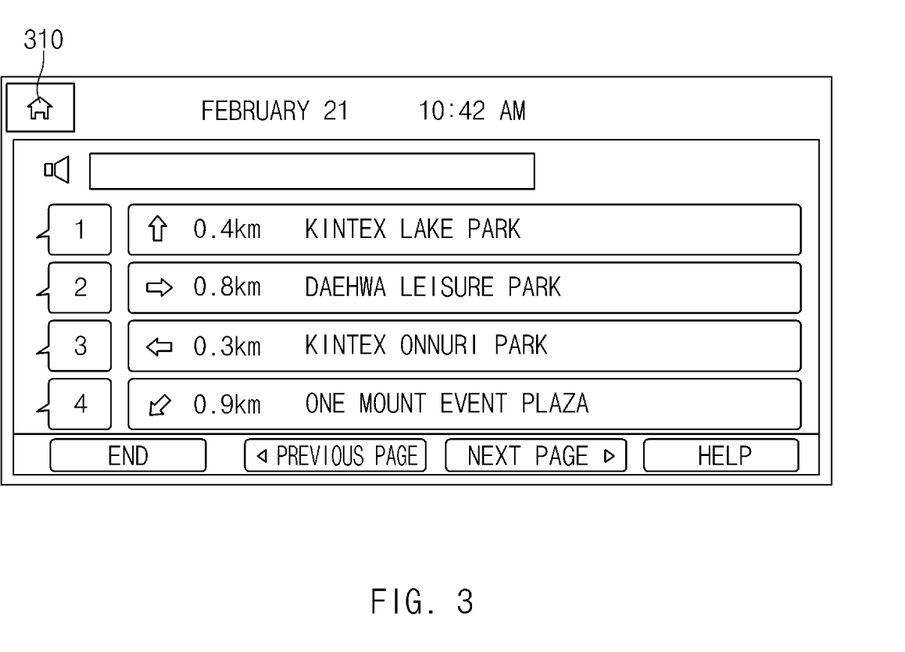
FIG. 3 shows each object in a screen of a touch display.

Further, the controller 30 may recognize each object (letter, number, symbol, and icon) on a screen on the touch display 70 at the time when the input button 210 is pressed. In one example, when a screen as shown in FIG. 3 is being displayed, the controller 30 may recognize an icon-shaped home key 310, "previous page", "end", "next page", "help", No. 1 for "Kintex Lake Park", No. 2 for "Daehwa Leisure Park", No. 3 for "Kintex Onnuri Park", No. 4 for "One mount Event Plaza", and the like. This technology for recognizing the letter, the number, the symbol, and the icon in the image is a well-known technology, thus a detailed description is omitted.

Further, the controller 30 may store the recognition result in the storage 40. In this connection, the storage 40 may include at least one type of a storage medium of at least one type of memory such as a flash memory type, a hard disk type, a micro type, and a card type (for example, an SD card (Secure Digital Card) or an XD card (eXtream Digital Card)), and the like, and a RAM (Random Access Memory), SRAM (Static RAM), ROM (Read Only Memory), PROM (Programmable ROM), EEPROM (Electrically Erasable PROM), MRAM (Magnetic RAM), a magnetic disk, and an optical disk type memory.

In one example, the controller 30 may classify the recognized voice command received from the voice recognition server 200 through the communication module 20 into a control command and a touch-based command. In this connection, the controller 30 may determine the recognized voice command as the control command when a predicate is present in the recognized voice command, whereas it may determine the recognized voice command as the touch-based command when there is no predicate in the recognized voice command. For example, the recognized voice command containing the predicate such as "Give Jenny a call", "Turn an air conditioner on", "Turn a heater on", and the like may be recognized as the control command. Further, the controller 30 may recognize, as the control command, a voice command for a vehicle control, a vehicle manual-related voice command, a voice command for requesting information that may be collected through a web, and the like. In this connection, the information that may be collected through the web may include weather information, famous restaurant information, sports information, and the like.

Further, the controller 30 may transmit the control command to the control command processing module 50, and transmit the touch-based command to the touch-based command processing module 60. In this connection, the control command processing module 50 may include a controller configured for controlling various systems in the vehicle (air conditioning system, communication system, and the like). In addition, the touch-based command processing module 60 may include a controller of an AVN (Audio Video Navigation) system that provides the vehicle manual and a web search function.

Next, the control command processing module 50 may perform a control operation corresponding to the control command (the voice recognition result provided from the voice recognition server 200) received from the controller 30. In this connection, the control command processing module 50 may turn on the air conditioner, turn on the heater, or make a call to Jenny.

Next, the touch-based command processing module 60 may select an object on the touch display 70 corresponding to the touch-based command (the voice recognition result provided from the voice recognition server 200) received from the controller 30. For example, with reference to FIG. 3, when the touch-based command is 'object No. 1', the 'object No. 1' is selected. Further, when the touch-based command is End, 'End' is selected. In this connection, the selection of the touch-based command processing module 60 may be the same as a touch of the user.

Further, in the selection of the object on the touch display 70 corresponding to the touch-based command received from the controller 30 (the voice recognition result received from the voice recognition server 200), even though the identified object in the screen is not the same as touch-based command as the recognized voice command, the touch-based command processing module 60 may select at least one object containing the touch-based command among the identified objects on the screen based on the recognized voice command. For example, with reference to FIG. 3, when the touch-based command as the recognized voice command is 'Lake Park', 'Kintex Lake Park' which includes 'Lake Park' may be selected.

Further, when there is no object on the touch display 70 corresponding to the touch-based command received from the controller 30 (the voice recognition result received from the voice recognition server 200), the touch-based command processing module 60 may determine the touch-based command as the control command, and transmit the touch-based command to the control command processing module 50.

Further, when the object on the touch display 70 corresponding to the touch-based command received from the controller 30 (the voice recognition result received from the voice recognition server 200) is an object (simply displayed characters) that may not be selected from the objects on the screen, the touch-based command processing module 60 may determine the touch-based command as the control command, and transmit the touch-based command to the control command processing module 50.

Next, the touch display 70 is a display mounted on the vehicle. Further, the touch display 70 may include a cluster, a display of the AVN (Audio Video Navigation) system, an auxiliary display, and the like. This touch display 70 may display various screens including a UI (User Interface), a GUI (Graphic User Interface). The present disclosure may be applied to any screen as long as the screen may be selected via the touch.

Figure 4:
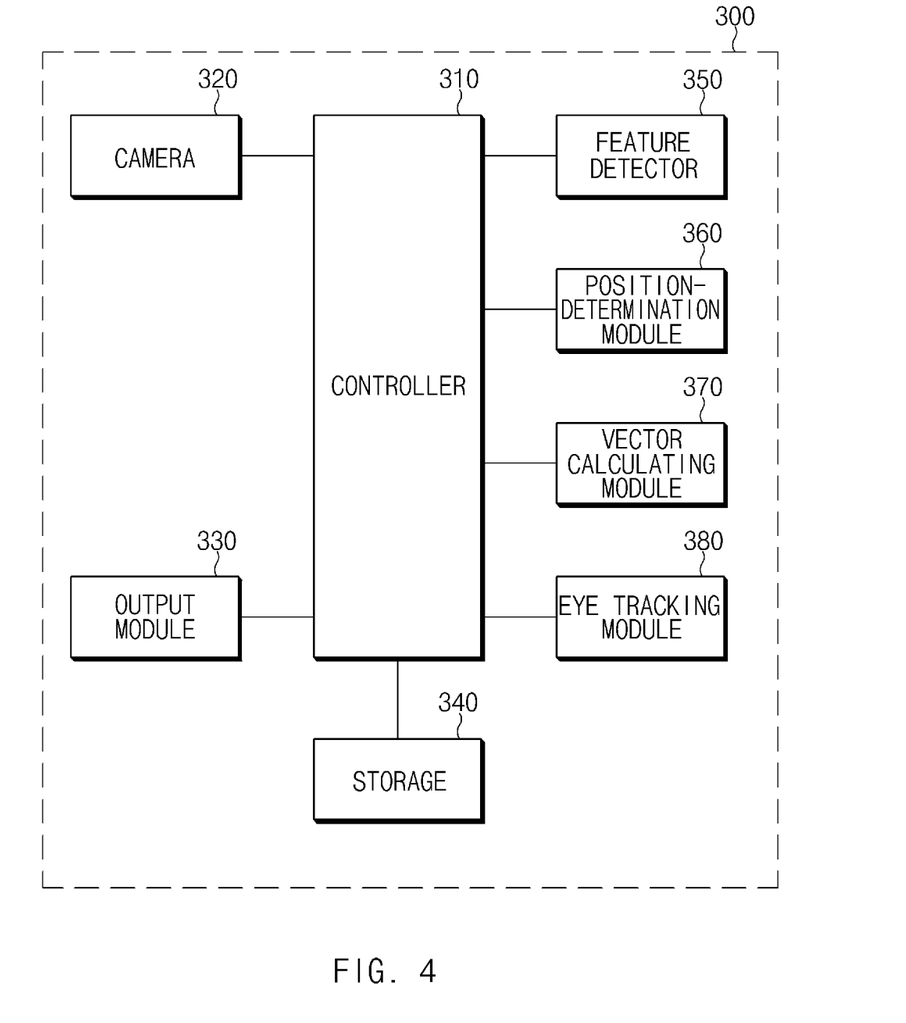
FIG. 4 is an exemplary diagram illustrating a configuration of an eye tracking device.

In one example, when a plurality of displays are mounted on the vehicle, a display desired by the user may be selected in an interlocking with an eye tracking device 300 mounted on the vehicle even without a selection by the user. That is, since the user speaks the touch-based command while watching the display screen, a display in which a driver's eye stays may be selected via the eye tracking device 300.

That is, when the plurality of displays are mounted on the vehicle, the controller 30 may recognize texts and icons on the screen of each of the displays, and select, as a target display, the display in which the user's eye stays at the time the voice command of the user is input.

Thereafter, the touch-based command processing module 60 may select an object corresponding to the touch-based command, on the screen of the display selected by the controller 30.

In addition, when the same screen operation is repeatedly performed through the voice recognition on the touch display, the controller 30 may convert the same screen operation into a macro. For example, when a selection in an upper layer and a selection in a lower layer are repeatedly performed, these selections may be converted into a macro using a specific touch-based command. Thus, the user may perform the selection in the upper layer and the selection in the lower layer at a time through the specific touch-based command.

FIG. 4 is an exemplary diagram illustrating a configuration of an eye tracking device used in the present disclosure.

As shown in FIG. 4, the eye tracking device 300 used in the present disclosure may include a controller 310, a camera 320, an output module 330, storage 340, a feature detector 350, a position-determination module 360, a vector calculating module 370, and an eye tracking module 380. In this connection, The controller 310 controls an operation of each component of the eye tracking device 300.

The camera 320 captures an image, particularly a face image of the user. In one example, the camera 320 may capture a face image of the driver on board the vehicle. In this connection, the camera 320 may include at least two cameras. In one example, the camera 320 may include a stereo camera having at least two imaging lenses. In this connection, the camera 320 may include a CCD (charge coupled device) camera, a CMOS (complementary metal oxide semiconductor) camera, and the like, but is not limited thereto.

The output module 330 may output an eye tracking result derived by the eye tracking device 300. In this connection, the output module 330 may provide the eye tracking result to an external device connected through a wireless communication or an external device connected via a cable.

In one example, the output module 330 may provide the eye tracking result from the eye tracking device 300 to an in-vehicle monitor, and to a vehicle control system that controls a vehicle driving based on a driver's condition.

The storage 340 may store a predetermined value for the operation of the eye tracking device 300, and a result value of each of the components of the eye tracking device 300. Further, the storage 340 may store a program or an algorithm for implementing the operation of each of the components of the eye tracking device 300. In one example, the storage 340 may store a feature detection algorithm, a position estimation algorithm, a vector calculation algorithm, an eye tracking algorithm, and the like.

Feature detector 350 detects features from the user's face image. The feature detector 350 may detect a light reflection point generated by an illumination of the camera 320 from eye areas of the user's face image.

Further, the feature detector 350 may detect at least two light reflection points generated by at least two lights from the user's face image.

Further, the feature detector 350 may detect center positions of pupils from the eye areas of the user's face image.

Further, the feature detector 350 may detect at least two features whose positions are fixed within the user's face image. In one example, the feature detector 350 may detect left and right end points of the user's eyes from the eye areas of the user's face image.

Further, the feature detector 350 may detect specific positions of user's facial features, for example, a mole, a scar, and eyebrows, and the like within the user's face image, and detect specific positions of accessories worn by the user, for example, glasses, and the like.

In this connection, when the features to-be-applied to the eye tracking is detected from the user's face image, the feature detector 350 may detect the same features from another face image of the user based on the pre-detected features. Of course, when the same feature is not detected from the face image of the user, a new feature may be detected again.

The position-determination module 360 determines center positions of cornea using the at least two light reflection points detected from the eye areas of the user's face image by the feature detector 350. Hereinafter, the face image in which the at least two light reflection points are detected by the feature detector 350 is referred to as a first face image.

In one example, the position-determination module 360 may determine the center position of cornea, as a point where extension lines intersect each other, in which the extension lines respectively connect the at least two lights emitting lights in different directions toward the cornea position of the user to the at least two light reflection points that occur in each of the eye areas of the first face image via the emission from the at least two lights.

On the other hand, when the at least two reflection points are not detected from the each of the eye areas of the user's face image by the feature detector 350, the position-determination module 360 may request the feature positions in the corresponding face image to the feature detector 350. Hereinafter, a face image in which the at least two light reflection points will not be detected by the feature detector 350 is referred to as a second face image. In this connection, the position-determination module 360 may determine center positions of cornea of the second face image using the features detected in the second face image by the feature detector 350 and a first vector calculated based on the center positions of the cornea previously detected from the first face image.

The vector calculating module 370 may calculate a vector from the at least two features detected from the first face image to the center position of the cornea in the first image determined by the position-determination module 360. In one example, the vector calculating module 370 may calculate a vector from the left end point of the user's eye detected from the first face image to the center position of the cornea, and calculate a vector from the right end point of the user's eye to the center of the cornea. In this connection, the calculated vector is referred to as the first vector, and the first vector may be used for the position-determination module 360 to determine the center position of the cornea from the second face image as described above.

In one example, the vector calculating module 370 may calculate a vector connecting a center position of a pupil detected in the eye area of the second face image from the center position of the cornea determined by the position-determination module 360 in the second face image. In this connection, the calculated vector is referred to as the second vector, and the second vector may be transmitted to the eye tracking module 380 to be used for tracking the user's eye.

The eye tracking module 380 may track a direction of the user's eye in the second face image using the second vector calculated by the vector calculating module 370. In this connection, the eye tracking module 380 may track the user's eye based on a position reached by the extension line extending the second vector. User's eye information tracked by the eye tracking module 380 may be stored in the storage 340, and provided to the controller 30 of the voice command processing device 100 for a vehicle via the output module 330.

Figure 5:
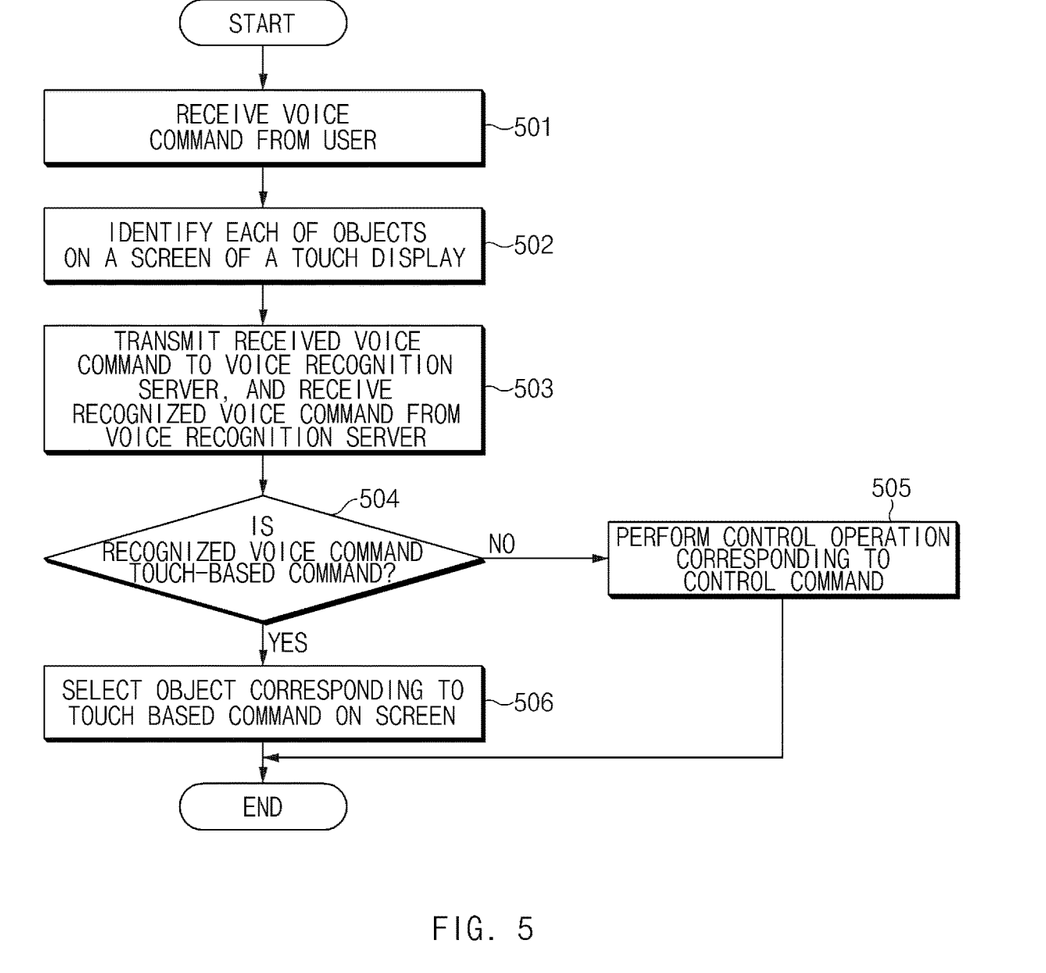
FIG. 5 is a flowchart of a method for processing a voice command for a vehicle.

FIG. 5 is a flow chart of a method for processing a voice command for a vehicle according to one form of the present disclosure.

First, the input module 10 receives the voice command from the user (501).

Then, the controller 30 identifies each of the objects on the screen of the touch display 70 (502). That is, each of the objects displayed on the touch display 70 is identified.

Thereafter, the communication module 20 transmits the voice command received from the user to the voice recognition server, and receives the recognized voice command from the voice recognition server (503).

Thereafter, the controller 30 determines whether the recognized voice command is the control command or the touch-based command (504).

As a result of the determination (504), when the recognized voice command is the control command, the control command processing module 50 performs the control operation corresponding to the control command (505).

As a result of the determination (504), when the recognized voice command is the touch-based command, the touch-based command processing module 60 selects the object corresponding to the touch-based command among the objects on the screen (506). That is, the object corresponding to the touch-based command is selected from the touch display 70.

Figure 6:
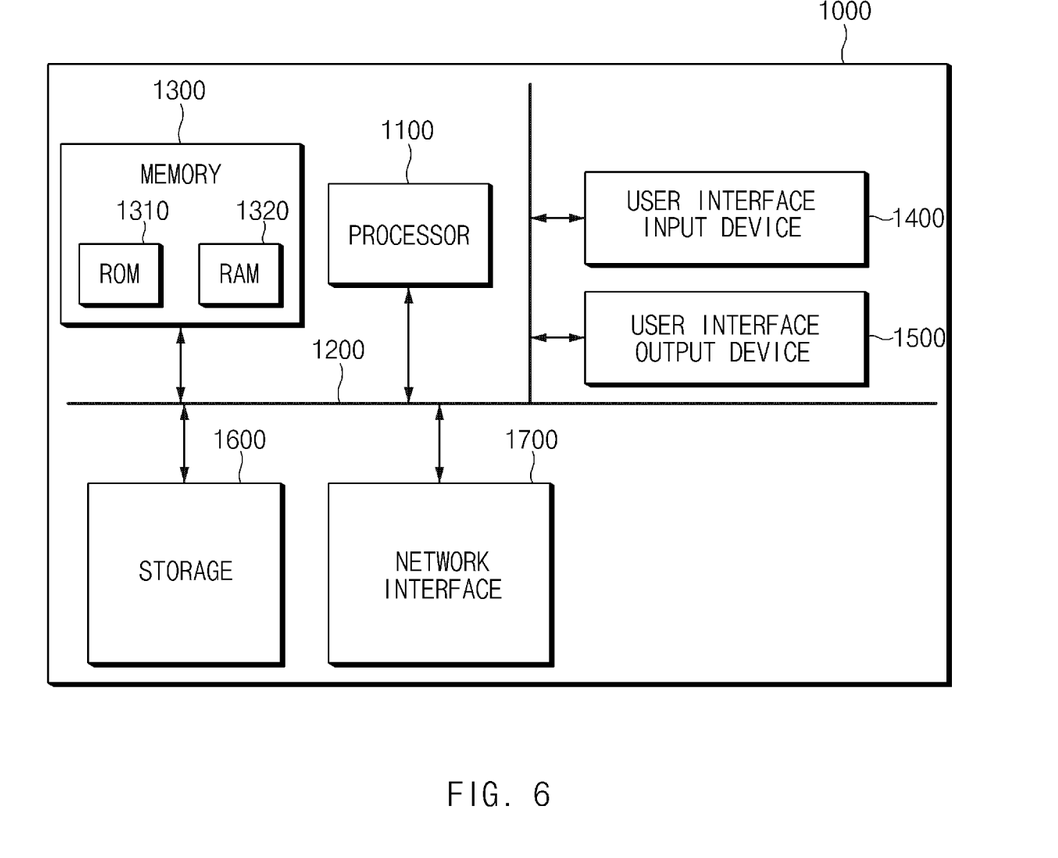
FIG. 6 is a block diagram illustrating a computing system for implementing a method for processing a voice command for a vehicle.

FIG. 6 is a block diagram illustrating a computing system for implementing a method for processing a voice command for a vehicle according to one form of the present disclosure.

With reference to FIG. 6, the method for processing a voice command for a vehicle described above may also be implemented through a computing system. A computing system 1000 may include at least one processor 1100, a memory 1300, a user interface input device 1400, a user interface output device 1500, storage 1600, and a network interface 1700 connected via a system bus 1200.

The processor 1100 may be a central processing unit (CPU) or a semiconductor device that performs processing on instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the forms disclosed herein may be embodied directly in hardware or a software module executed by the processor 1100, or in a combination thereof. The software module may reside on a storage medium that is, the memory 1300 and/or the storage 1600 such as a RAM memory, a flash memory, a ROM memory, an EPROM memory, an EEPROM memory, a register, a hard disk, a removable disk, a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the exemplary forms disclosed in the present disclosure are not intended to limit the technical idea of the present disclosure but to illustrate the present disclosure, and the scope of the technical idea of the present disclosure is not limited by the exemplary forms. The scope of the present disclosure should be construed as being covered by the scope of the appended claims, and all technical ideas falling within the scope of the claims should be construed as being included in the scope of the present disclosure.

The device and the method for processing a voice command for a vehicle according to one form of the present disclosure may classify the voice command received from the user into the control command and the touch-based command, and process the control command and the touch-based command, respectively. Therefore, the device and the method may operate devices based on the control command, and select the object on the display corresponding to the touch-based command.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A device comprising:
   a non-transitory memory configured to store instructions executable to process a voice command for a vehicle; and
   a processor configured to execute the instructions to:
   transmit the voice command received from a user to a voice recognition server;

receive a recognized voice command from the voice recognition server;
identify objects displayed on a screen of a touch display of the vehicle;
classify the recognized voice command into a control command and a touch-based command;
perform a control operation corresponding to the control command; and
select an object corresponding to the touch-based command among the objects on the screen of the touch display.

2. The device of claim 1, wherein when a predicate is present in the recognized voice command, the processor is configured to determine the recognized voice command as the control command.

3. The device of claim 1, wherein the non-transitory memory is configured to store each of the identified objects displayed on the screen.

4. The device of claim 1, wherein the processor is configured to select at least one object containing the touch-based command, among the identified objects on the screen, based on the recognized voice command.

5. The device of claim 1, wherein when the object corresponding to the touch-based command based on the recognized voice command is absent among the identified objects on the screen, the processor is configured to determine the touch-based command as the control command.

6. The device of claim 1, wherein when the object corresponding to the touch-based command is not able to be selected among the identified objects on the screen, the processor is configured to determine the touch-based command as the control command.

7. The device of claim 1, further comprising an eye tracking device configured to track an eye of the user.

8. The device of claim 7, wherein when the touch display includes a plurality of touch displays, the processor is configured to specify one touch display among the plurality of touch displays using the eye tracking device.

9. The device of claim 8, wherein the processor is configured to select a touch display, among the plurality of touch displays, based on a gaze of the eye of the user at a time when the voice command is input from the user.

10. The device of claim 1, further comprising an input button configured to inform an input of the voice command from the user.

11. The device of claim 10, wherein the processor is configured to identify each of the objects on the screen of the touch display at a time when the input button is pressed.

12. A method for processing a voice command for a vehicle, the method comprising:
identifying, by a processor, objects displayed on a screen of a touch display;
transmitting, by the processor, a voice command received from a user to a voice recognition server;
receiving, by the processor, a recognized voice command from the voice recognition server;
classifying, by the processor, the recognized voice command into a control command and a touch-based command;
performing, by the processor, a control operation corresponding to the control command; and
selecting, by the processor, an object corresponding to the touch-based command from the screen of the touch display.

13. The method of claim 12, wherein classifying the recognized voice command includes determining the recognized voice command as the control command when a predicate is present in the recognized voice command.

14. The method of claim 12, further comprising storing, by a non-transitory memory, each of the identified objects displayed on the screen.

15. The method of claim 12, wherein selecting the object corresponding to the touch-based command includes selecting at least one object containing the touch-based command, among the identified objects on the screen, based on the recognized voice command.

16. The method of claim 12, wherein selecting the object corresponding to the touch-based command includes: determining the touch-based command as the control command when the object corresponding to the touch-based command is absent among the identified objects on the screen.

17. The method of claim 12, wherein selecting the object corresponding to the touch-based command includes: determining the touch-based command as the control command when the object corresponding to the touch-based command is not able to be selected among the identified objects on the screen.

18. The method of claim 12, when the touch display includes a plurality of touch displays, further comprising specifying, by the processor, one touch display, among the plurality of touch displays, using an eye tracking device.

19. The method of claim 18, wherein specifying the one touch display among the plurality of touch displays includes selecting the one touch display based on a gaze of an eye of the user at a time when the voice command is input from the user.

20. The method of claim 12, wherein identifying the objects displayed on the touch display includes identifying each of the objects on the screen of the touch display at a time when an input button is pressed for an input of the voice command of the user.

* * * * *